US010963668B2

(12) United States Patent
Kim et al.

(10) Patent No.: US 10,963,668 B2
(45) Date of Patent: Mar. 30, 2021

(54) METHOD OF PREPROCESSING IMAGE INCLUDING BIOLOGICAL INFORMATION

(71) Applicant: Samsung Electronics Co., Ltd., Suwon-si (KR)

(72) Inventors: Kyuhong Kim, Seoul (KR); Wonjun Kim, Hwaseong-si (KR); Youngsung Kim, Suwon-si (KR); Sungjoo Suh, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 123 days.

(21) Appl. No.: 16/100,683

(22) Filed: Aug. 10, 2018

(65) Prior Publication Data

US 2018/0349674 A1    Dec. 6, 2018

Related U.S. Application Data

(62) Division of application No. 15/049,529, filed on Feb. 22, 2016, now Pat. No. 10,049,258.

(30) Foreign Application Priority Data

Jun. 11, 2015    (KR) .................. 10-2015-0082693

(51) Int. Cl.
*G06K 9/00* (2006.01)
*G06K 9/32* (2006.01)

(52) U.S. Cl.
CPC ....... *G06K 9/00067* (2013.01); *G06K 9/3241* (2013.01)

(58) Field of Classification Search
CPC ............ G06K 9/00067; G06K 9/3241; G06K 2009/00932; G06K 9/00892; G06K 9/00885; G06K 9/0061
See application file for complete search history.

(56) References Cited

U.S. PATENT DOCUMENTS

| | | | |
|---|---|---|---|
| 7,616,787 B2 | 11/2009 | Boshra | |
| 8,045,767 B2 | 10/2011 | Du et al. | |
| 8,929,619 B2 | 1/2015 | Russo | |
| 2005/0157913 A1 | 7/2005 | Yau et al. | |

(Continued)

FOREIGN PATENT DOCUMENTS

| | | |
|---|---|---|
| JP | 4134522 B2 | 8/2008 |
| JP | 5574515 B2 | 8/2014 |
| KR | 100780957 B1 | 12/2007 |

(Continued)

OTHER PUBLICATIONS

Hong et al., "Fingerprint Image Enhancement: Algorithm and Performance Evaluation", IEEE Translations on Pattern Analysis and Machine Intelligence, vol. 20, No. 8, Aug. 1998.

(Continued)

*Primary Examiner* — Menatoallah Youssef
(74) *Attorney, Agent, or Firm* — Harness, Dickey & Pierce, P.L.C.

(57) ABSTRACT

A method of preprocessing an image including biological information is disclosed, in which an image preprocessor may set an edge line in an input image including biological information, calculate an energy value corresponding to the edge line, and adaptively crop the input image based on the energy value.

9 Claims, 12 Drawing Sheets

(56) References Cited

U.S. PATENT DOCUMENTS

2005/0238212 A1* 10/2005 Du .................... G06K 9/00026
382/124
2011/0085734 A1* 4/2011 Berg .................... G06F 16/785
382/195

FOREIGN PATENT DOCUMENTS

| KR | 100891324 B1 | 3/2009 |
| KR | 100958962 B1 | 5/2010 |
| KR | 101249680 B1 | 4/2013 |
| KR | 101460964 B1 | 11/2014 |

OTHER PUBLICATIONS

Reddy et al., "An FFT-Based Technique for Translation, Rotation, and Scale-Invariant Image Registration," IEEE Transactions on Image Processing, vol. 5, No. 8, 1996.
Wolberg et al., "Robust Image Registration Using Log-Polar Transform," IEEE Intl. Conf. On Image Processing, Sep. 2000, Department of Computer Science, City College of New York, NY, USA.

* cited by examiner

METHOD OF PREPROCESSING IMAGE INCLUDING BIOLOGICAL INFORMATION

CROSS-REFERENCE TO RELATED APPLICATION

This application is a divisional of and claims priority under 35 U.S.C. §§ 120/121 to U.S. patent application Ser. No. 15/049,529, filed on Feb. 22, 2016, which claims priority under 35 U.S.C. § 119 to Korean Patent Application No. 10-2015-0082693, filed on Jun. 11, 2015, in the Korean Intellectual Property Office, the entire contents of each of which are incorporated herein by reference in their entirety.

BACKGROUND

1. Field

At least one example embodiment relates to a method of preprocessing an image including biological information.

2. Description of the Related Art

Recently, an importance of secure authentication is increasing due to a development of various mobile devices such as smartphones and wearable devices. Biometric based authentication technology may perform user authentication using, for example, a fingerprint, an iris, a voice, a face, and blood vessels. Such biological characteristics used for the authentication differ from individual to individual, rarely change during a lifetime, and have a low risk of being stolen or copied. In addition, individuals do not need to intentionally carry such characteristics at all times and thus, may not suffer an inconvenience using the biological characteristics.

Currently, a fingerprint recognition method is most commonly used due to a high level of convenience, security, and economic efficiency. The fingerprint recognition method may reinforce security of a user device and provide various application services, for example, mobile payment.

Sensors sensing biological information may be produced to have various specifications and thus, images to be output from individual sensors may also have various specifications. Thus, there is a desire for technology for preprocessing images of various specifications to register and recognize a fingerprint.

SUMMARY

At least some example embodiments relate to an image preprocessing method.

According to at least some example embodiments an image preprocessing method includes obtaining an input image including biological information; setting at least one edge line in the input image; calculating at least one energy value corresponding to the at least one edge line; and cropping the input image based on the at least one energy value.

The at least one energy value may include a variance of pixel values included in the at least one edge line.

The at least one edge line may include lines located on at least two different edges in the input image.

The cropping may include performing a comparison operation based on the at least one energy value; detecting an edge line having a minimum energy value based on a result of the comparison operation; and removing the detected edge line. The cropping may include comparing the at least one energy value to a threshold energy value; detecting an edge line having an energy value less than the threshold energy value based on a result of the comparing; and removing the detected edge line.

The method may further include determining whether a size of the cropped input image satisfies a first size condition; and setting at least one second edge line in the cropped input image, calculating at least one second energy value corresponding to the at least one second edge line, and additionally cropping the cropped input image based on the at least one second energy value, in response to a determination that the size of the cropped input does not satisfy the first size condition.

The first size condition may include at least one of a condition that a size of the cropped input image is a first size; a condition that a length of any one side of the cropped input image is a first length; or a condition that at least one side of the cropped input image includes a number of pixels, the number of the pixels being a power of 2.

The obtaining of the input image may include detecting a biological input as a form of an analog signal; and obtaining the input image by converting the analog signal to a digital image.

The method may further include enhancing the cropped input image using a frequency transform operation.

The biological information may include at least one of fingerprint information, blood vessel information, or iris information.

According to at least some example embodiments, an image preprocessing method may include obtaining an input image including biological information; setting a reference line in the input image; calculating a reference energy value corresponding to the set reference line; setting a first line in the input image; calculating a first energy value corresponding to the set first line; and determining an effective area in the input image based on the reference energy value and the first energy value.

The reference line may include at least one line passing through a center of the input image.

The setting of the first line may include setting the first line in an order starting from any one edge of the input image to an opposite edge direction, progressing iteratively to determine the effective area.

The reference energy value may include a variance of pixel values includes in the reference line, and the first energy value includes a variance of pixel values includes in the first line.

The determining may include determining whether the first line is included in the effective area by performing a comparison operation based on the energy value and the reference energy value. The determining may include at least one of determining the first line to be a boundary of the effective area in response to the first energy value being greater than the reference energy value; and setting a subsequent line in the input image, calculating a subsequent energy value corresponding to the subsequent line, and determining the effective area in the input image based on the reference energy value and the subsequent energy value, in response to the first energy value being less than the reference energy value.

The method may further include determining whether a first number of boundaries is determined for the effective area; and setting a second line for a boundary yet to be determined in the input image, calculating a second energy value corresponding to the second line, and determining the effective area in the input image based on the reference energy value and the second energy value, in response to a determination that the number of boundaries is not determined for the effective area. The method may further include determining whether to receive a re-input image based on the effective area. The biological information may include at least one of fingerprint information, blood vessel information, and iris information.

According to at least some example embodiments, a computer program is embodied on a non-transitory computer readable medium, the computer program being configured to control a processor to perform the method.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
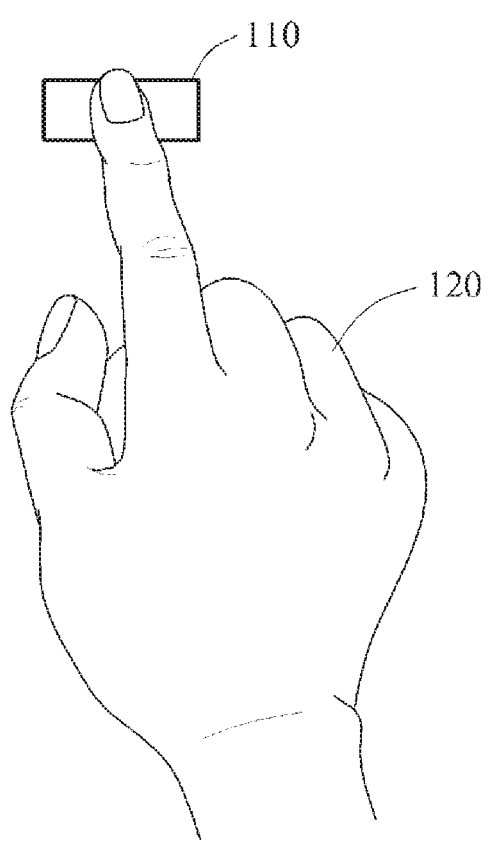
FIG. 1 illustrates an operation of obtaining an input image including biological information according to at least one example embodiment.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein. Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items. It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device.

The plurality of device structures may be arranged in an array and/or in a two-dimensional pattern.

at least some example embodiments Unless otherwise defined, all terms including technical and scientific terms used herein have the same meaning as commonly understood by one of ordinary skill in the art to which these example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments to be described hereinafter may be used to preprocess an input image including biological information. For example, a preprocessing operation according to at least some example embodiments may be performed before a recognition operation is performed in a fingerprint recognizer, a blood vessel recognizer, an iris recognizer, and the like. Hereinafter, an operation of recognizing biological information of a user may include an operation of authenticating or identifying the user by recognizing the biological information of the user.

At least some example embodiments may be provided in various forms of products including, for example, a personal computer (PC), a laptop computer, a tablet PC, a smartphone, a television (TV), a smart home appliance, an intelligent vehicle, a kiosk, and a wearable device. For example, at least some example embodiments may be applied to image preprocessing for user authentication in a smartphone, a mobile device, a smart home system, and the like. Similarly, at least some example embodiments may be applied to a payment service and an intelligent vehicle system through user authentication. At least some example embodiments may provide a result of user authentication robust against a situation in which a finger of a user is small or an input fingerprint is inaccurate. Hereinafter, at least some example embodiments will be described in detail with reference to the accompanying drawings.

FIG. 1 illustrates an operation of obtaining an input image including biological information according to at least one example embodiment. For ease of description hereinafter, the biological information is assumed to be a fingerprint. However, various sets of biological information recognizable in a form of an image of blood vessels, an iris, and the like may be used to provide the biological information.

Referring to FIG. 1, a sensor 110 senses a fingerprint input from a user. For example, the sensor 110 may include a plurality of sensing elements. The sensing elements may be arranged in a form of an array or in a matrix structure. The sensor 110 senses the input fingerprint, hereinafter also referred to as a fingerprint input, in a form of an analog signal using the sensing elements. The sensor 110 converts the sensed analog signal to a digital image using an analog-to-digital converter (ADC). Hereinafter, the term "input image", as used herein, will refer to the digital image obtained through the conversion.

Here, a size of the sensor 110 may differ from a size of a finger 120 of the user. A specification of the sensor 110 may be different from manufacturers producing the sensor 110, and a size of a finger may be different from users. For example, in a case of a user having a small finger, for example, a female user and a child, information irrelevant to a fingerprint may be sensed by the sensor 110. Also, noise information may be sensed by the sensor 110 due to foreign substances such as perspiration. Also, fingerprint information may be inaccurately input in various situations, for example, when a fingerprint is input on the move. In such a case, a portion that does not correspond to the fingerprint, which is also referred to as a non-fingerprint area, may be included in an input image. Although described in detail hereinafter, example embodiments may provide technology for removing, from an input image, such a non-fingerprint area which does not correspond to a fingerprint.

In addition, since a specification of the sensor 110 differs based on manufacturers producing the sensor 110, the fingerprint may not be readily recognized using a same recognizer in a fingerprint recognition application. The specification may include a size of a sensor array, a sensor resolution, and the like. The size of a sensor array refers to a size of a sensed area to be formed by the sensing elements. For example, the size of a sensor array may be 1 centimeter (cm) in height×3 cm in width. The sensor resolution indicates a number of the sensing elements per unit length or unit area. When the sensor 110 has a higher resolution despite the same size of the sensor array, a greater number of sensing elements may be included in the sensor 110. For example, the sensor resolution may be 56 pixels in height×144 pixels in width.

Although described in detail, example embodiments described herein may provide technology for recognizing a fingerprint without correcting a recognizer despite different sensor specifications by cropping an input image into an image of a preset or, alternatively, desired size. The preset or, alternatively, desired size may refer to a size used in a recognizer being used. At least some example embodiments may provide technology for increasing a fingerprint recognition rate by adaptively cropping a portion including less fingerprint information in an input image.

In addition, at least some example embodiments may provide technology for determining whether an input image includes information sufficient for fingerprint recognition by calculating an effective area corresponding to a fingerprint in the input image. When the input image is not determined to include the information sufficient for fingerprint recognition, a fingerprint recognition application may request a user to re-input a fingerprint, rather than recognizing or registering the fingerprint using the input image.

Further, at least some example embodiments may provide technology for improving a fingerprint authentication performance by processing an input image when performing the fingerprint authentication using a touch-type fingerprint sensor. At least some example embodiments may provide technology for determining whether to use an input image for fingerprint authentication by evaluating a quality of the input image.

At least some example embodiments may provide technology for increasing a fingerprint recognition rate by removing a non-fingerprint area unnecessary for fingerprint recognition. The technology may remove the non-fingerprint area in a line unit and thus, a removed boundary may be consistently indicated in a frequency spectrum. Thus, performance deterioration may be prevented by removing the non-fingerprint area. In addition, the technology may effectively remove the non-fingerprint area irrespective of a quality of an input image by comparing energy values calculated from edge lines in the input image and detecting the non-fingerprint area, instead of detecting the non-fingerprint area using a fixed threshold value. At least some example embodiments may provide technology for preventing a decrease in a fingerprint recognition rate without incorporating a fingerprint image including less fingerprint information into registration data.

At least some example embodiments may provide technology for increasing a fingerprint recognition speed. For example, the technology may perform an operation necessary for fingerprint recognition only on a cropped portion, in lieu of performing such an operation on an entire input image. The technology may adjust a size of an input image to be a power of 2. When the size of the input image increases twofold, high-speed processing may be enabled to find registration information in a transform domain, and global image enhancement may be enabled only with a one-time two-dimensional (2D) fast Fourier transform (FFT).

FIGS. 2 through 4B illustrate an operation of adaptively cropping an input image according to at least one example embodiment. The operation of adaptively cropping an input image may be performed by an image preprocessor according to an embodiment. The image preprocessor may be provided in a form of a software module and implemented by at least one processor. The software module may be recorded in a form of a program in a memory connected to the processor. Alternatively, the image preprocessor may be provided in a form of a hardware module. Alternatively, the image preprocessor may be provided in a form of a combination of the software module and the hardware module. In such a case, a function implemented by the software module may be performed by the processor, and a function implemented by the hardware module may be performed by a corresponding hardware. The processor and the hardware may mutually exchange a signal through an input and output bus.

Figure 2:
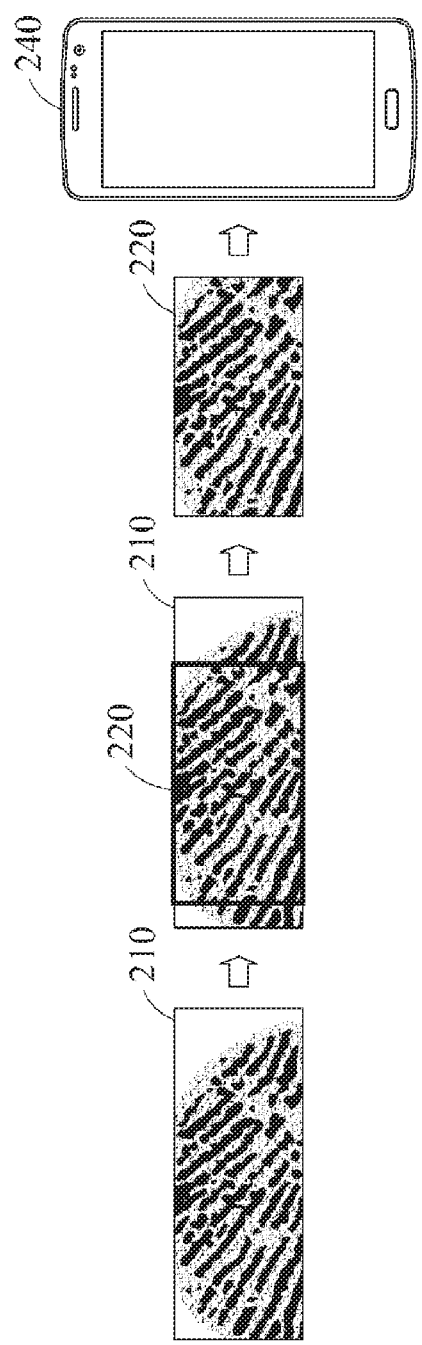
FIGS. 2 through 4B illustrate an operation of adaptively cropping an input image according to at least one example embodiment.

Referring to FIG. 2, an input image 210 includes fingerprint information. As described in the foregoing, since a sensor specification differs from manufacturers, a fingerprint recognition application may not use a same recognizer. The image preprocessor may crop the input image 210 into an image of a preset or, alternatively, desired size and thus, allow the fingerprint recognition application to use an input image sensed through a sensor of various specifications without changing a recognizer.

When cropping an input image 210, the image preprocessor may determine a portion to be adaptively removed. As illustrated in FIG. 2, an upper left portion and a right portion in the input image 210 do not include the fingerprint information. The image preprocessor generates a result image 220 by adaptively cropping the input image 210. The result image 220 has the preset or, alternatively, desired size, and includes a maximum or, alternatively, increased amount of effective information in the size that may be used for fingerprint recognition. Thus, a fingerprint recognition rate may be improved.

The result image 220 is provided to a device 240 operating the fingerprint recognition application. The result image 220 may be used for fingerprint registration or fingerprint recognition. For ease of description, the image preprocessor is illustrated to operate separately from the device 240. However, the image preprocessor may be included in the device 240. For example, the image preprocessor may operate by at least one processor or at least one other hardware-implemented device included in the device 240, or a combination thereof.

Figure 3:
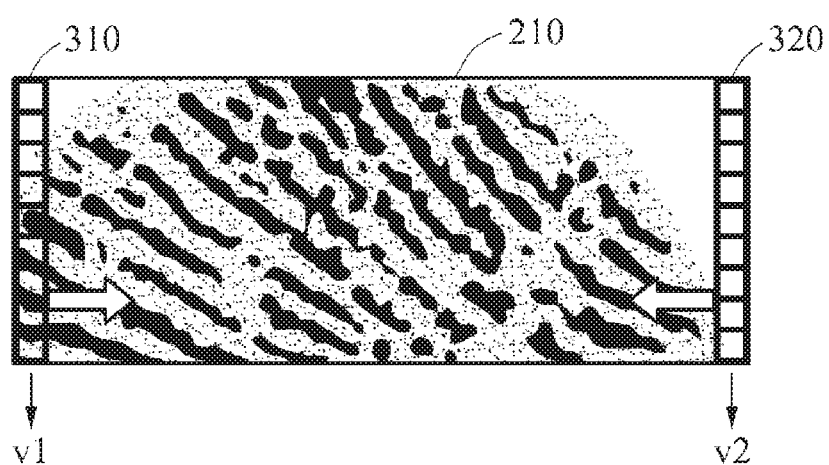

Hereinafter, the operation of adaptively cropping the input image 210 will be described in detail with reference to FIG. 3. Referring to FIG. 3, the image preprocessor sets a plurality of edge lines, for example, a first edge line 310 and a second edge line 320, in the input image 210. An edge line refers to a line located at an edge in an input image. For example, when the input image 210 is provided in a quadrangular form, an edge line may be located at a left edge, a right edge, an upper edge, or a lower edge.

An input image may include a plurality of pixels. The pixels may correspond to sensing elements in a sensor. For example, a pixel value of each pixel may indicate information sensed by a corresponding sensing element (e.g., brightness).

An edge line may include a plurality of edge pixels located at an edge of an input image. The image preprocessor may calculate an energy value corresponding to an edge line based on pixel values of the edge pixels included in the edge line. For example, when an edge line includes a greater amount of fingerprint information, an energy value corresponding to the edge line may be calculated to be greater. Conversely, when an edge line includes a lower amount of fingerprint information, an energy value corresponding to the edge line may be calculated to be lower.

The image preprocessor may calculate such an energy value using a preset or, alternative, desired energy function. For example, the preset or, alternative, desired energy function may refer to a function used to calculate a variance of the pixel values of the edge pixels included in the edge line. According to an embodiment, the energy function may not be limited to the function for calculating the variance. The energy function may be modified to be a function for outputting a value proportional to an amount of fingerprint information included in the edge line. For example, the energy function may be a function for calculating a mean of the pixel values of the edge pixels included in the edge line.

In one example, the image preprocessor sets the first edge line 310 corresponding to the left edge in the input image 210. The image preprocessor calculates a first energy value "v1" corresponding to the first edge line 310. The image preprocessor crops the input image 210 based on the v1. For example, the image preprocessor may compare the v1 to a threshold energy value, and remove the first edge line 310 in response to the v1 being less than the threshold energy value. The threshold energy value may be predetermined or, alternatively, determined in response to a standard for determining usability of fingerprint information included in an edge line. The image preprocessor determines whether an amount of fingerprint information included in the first edge line 310 set in the input image 210 satisfies the standard, and adaptively crops the input image 210.

In another example, the image preprocessor sets the first edge line 310 corresponding to the left edge in the input image 210 and the second edge line 320 corresponding to the right edge in the input image 210. The image preprocessor calculates the v1 corresponding to the first edge line 310 and a second energy value "v2" corresponding to the second edge line 320.

The image preprocessor crops the input image 210 based on the v1 and the v2. For example, the image preprocessor may compare the v1 to the v2, and detect an edge line including a lower amount of fingerprint information. Here, the first edge line 310 includes a greater number of edge pixels including the fingerprint information than the second edge line 320. In such a case, the v1 may be calculated to be greater than the v2. The image preprocessor may detect the second edge line 320 to be the edge line including the lower amount of the fingerprint information because the v2 is less than v1. The image preprocessor adaptively crops the input image 210 by removing the detected second edge line 320.

The image preprocessor may determine whether a size of the cropped input image satisfies a predetermined or, alternatively, desired size condition. The predetermined or, alternatively, desired size condition may be variously set to be a condition of which the size of the cropped input image corresponds to a preset or, alternatively, desired size, a condition of which a length of any one side of the cropped input image corresponds to a preset or, alternatively, desired length, or a condition of which at least one side of the cropped input image includes pixels. Here, a number of the pixels corresponds to a power of 2. A size of the input image 210 may be expressed as a size of a pixel array. For example, the size of the input image 210 may be 56 pixels in height×144 pixels in width.

In example embodiments described with reference to FIGS. 2 through 4, adaptive cropping may be performed only on a length in a horizontal direction. For example, the preset or, alternatively, desired size may be 56 pixels in height×128 pixels in width. In such an example, the image preprocessor may adaptively remove 16 lines in the horizontal direction of the input image 210 to crop the input image 210 to be the preset or, alternatively, desired size of 56 pixels in height×128 pixels in width. The adaptive cropping may not be limited to the horizontal direction and thus, such an operation may be applicable to a vertical direction and a lateral and vertical direction.

When the size of the cropped input image is determined to be unsatisfactory for the predetermined or, alternatively, desired size condition, the image preprocessor may iterate the operations described in the foregoing. For example, the image preprocessor may iterate the operations 16 times to crop the input image 210 of the size of 56 pixels in height×144 pixels in width to be the preset or, alternatively, desired size of 56 pixels in height×128 pixels in width. Thus, the result image 220 may be generated as illustrated in FIG. 2.

Referring back to FIG. 3, when the first edge line 310 is removed at a current iteration, the first edge line 310 may be set to be a subsequent line in a right direction at a subsequent iteration. When the second edge line 320 is removed at the current iteration, the second edge line 320 may be set to be a subsequent line in a left direction at the subsequent iteration.

Figure 4A:
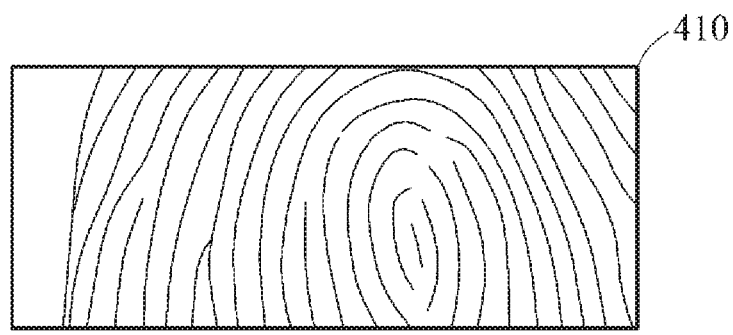
Figure 4B:

Referring to FIGS. 4A and 4B, a graph 420 of FIG. 4B indicates a distribution of energy of lines distinguished along a horizontal direction in an input image 410 of FIG. 4A. For example, the lines in the input image 410 may have different horizontal direction components, for example, x-axis values. Referring to the graph 420, an area without fingerprint information has a relatively low energy value, and an area having fingerprint information has a relatively high energy value. Thus, the image preprocessor may adaptively crop the input image 410 by removing lines having an energy value less than a predetermined or, alternatively, desired value.

An operation of the image preprocessor may be implemented as an adaptive image cropping (AIC) algorithm illustrated in Table 1. The AIC algorithm may iteratively remove, from an input image in a line unit, a column or a row in an upper, a lower, a left, and a right edge portion.

TABLE 1

1. Initalize start and end point
   n_start = 1, m_start=1
   n_end=N, m_end = M
2. find minimum projected energy value at four edges
   min_value = min{$f_x$(n_start), $f_x$(n_end), $f_y$(m_start) $f_y$(m_end)}
3. update edge index that shows the minimum value.
   Update n_start ++ or m_start++ or n_end -- or m_end --
4. compare min_value with a threshold, then smaller than the threshold go to step 2, or go to 5
5. crop the given image with the given four crop indexes Referring to Table 1, in a first operation of the AIC algorithm, the image preprocessor initializes indices of edge lines corresponding to four edges in an input image. Here, "n_start" denotes an index of an edge line corresponding to a left edge, and "n_end" denotes an index of an edge line corresponding to a right edge. "m_start" denotes an index of an edge line corresponding to an upper edge, and "m_end" denotes an index of an edge line corresponding to a lower edge. A size of the input image may be M pixels in height×N pixels in width.

In a second operation of the AIC algorithm, the image preprocessor calculates energy values of all the edge lines corresponding to the four edge lines, and extracts a minimum energy value (or, alternatively, an energy value below a desired threshold) "min_value" from the calculated energy values. "fx( )" denotes a function for calculating an energy value of an edge line in a vertical direction, for example, a left edge line and a right edge line, and "fy( )" denotes a function for calculating an energy value of an edge line in a horizontal direction, for example, an upper edge line and a lower edge line.

In a third operation of the AIC algorithm, the image preprocessor updates an index of the edge line having the minimum energy value (or, alternatively, an energy value below a desired threshold). For example, when the left edge line has the min_value, the image preprocessor may increase the n_start. When the right edge line has the min_value, the image preprocessor may decrease the n_end. Similarly, when the upper edge line has the min_value, the image preprocessor may increase the m_start. When the lower edge line has the min_value, the image preprocessor may decrease the m_end.

In a fourth operation of the AIC algorithm, the image preprocessor compares the min_value to a threshold value. In response to the min_value being less than the threshold value as a result of the comparing, the image preprocessor returns to the second operation of the AIC algorithm and iteratively performs the operation. In response to the min_value being greater than or equal to the threshold value, the image preprocessor performs a fifth operation of the AIC algorithm.

In the fifth operation of the AIC algorithm, the image preprocessor crops the input image based on the four edge indices. The four edge indices may be also referred to as crop indices. When a size of the cropped image obtained by cropping the input image is less than or equal to a preset or, alternatively, desired size, the image preprocessor may determine that the input image includes insufficient fingerprint information. In such a case, fingerprint authentication may not be performed, and the image preprocessor may request a user to re-input a fingerprint.

The AIC algorithm illustrated in Table 1 is provided as an example and thus, various modifications may be made to the AIC algorithm. In one example, as an alternative to comparing the min_value to the threshold value in the fourth operation of the AIC algorithm, the image preprocessor may compare a difference between horizontal indices, for example, a difference between the n_end and n_start, to a threshold horizontal length value, or compare a difference between vertical indices, for example, a difference between the m_end and m_start, to a threshold vertical length value. The threshold horizontal length value may correspond to a preset or, alternative, desired width at which the input image is to be cropped, and the threshold vertical length value may correspond to a preset or, alternative, desired height at which the input image is to be cropped.

When the difference between the horizontal indices reaches the threshold horizontal length value, only the vertical indices may be used in the second operation of the AIC algorithm, and only the vertical indices may be updated in the third operation of the AIC algorithm. When the difference between the vertical indices reaches the threshold vertical length value, only the horizontal indices may be used in the second operation of the AIC algorithm, and only the horizontal indices may be updated in the third operation of the AIC algorithm.

Figure 5:
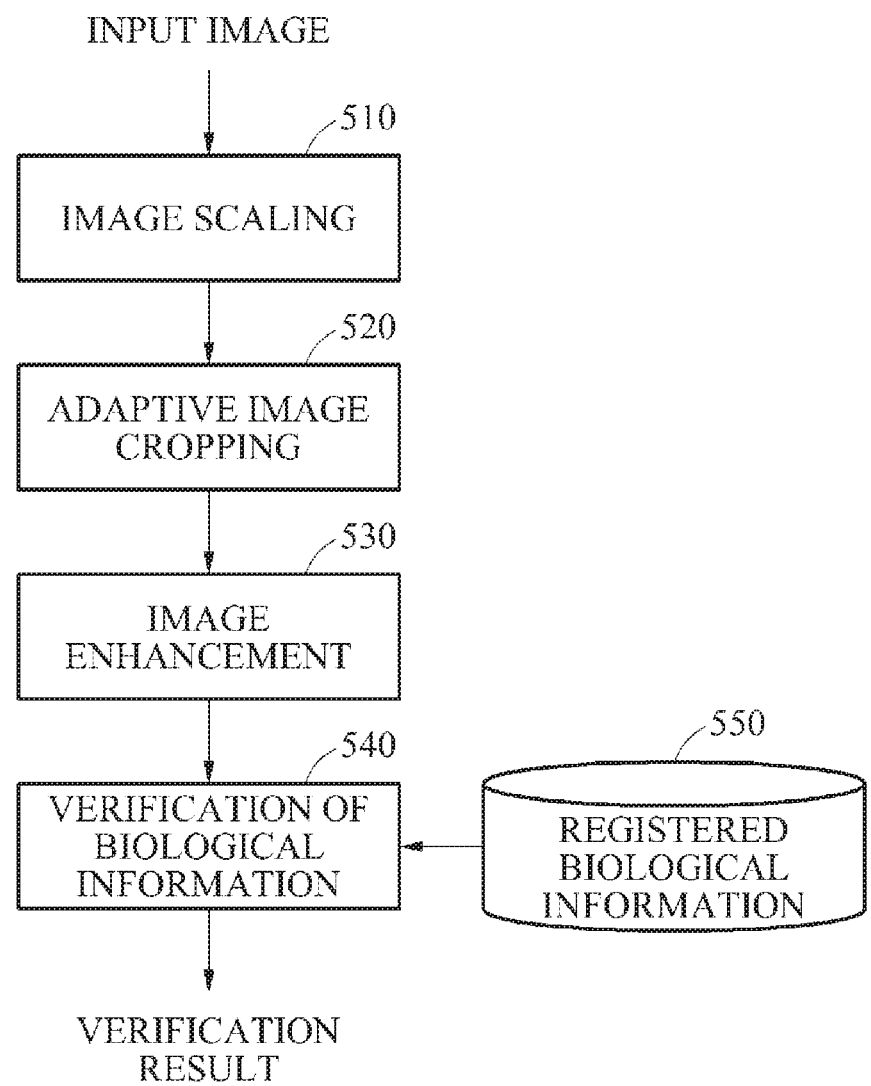
FIG. 5 illustrates an example of a method of verifying biological information using an adaptive image cropping method according to at least one example embodiment.

FIG. 5 illustrates an example of a method of verifying biological information using an adaptive image cropping method according to at least one example embodiment. Referring to FIG. 5, an image preprocessor performs operations 520 and 530. In operation 520, the image preprocessor adaptively crops an input image. The descriptions provided with reference to FIGS. 1 through 4B may be applied to the operation 520 and thus, more detailed and repeated descriptions will be omitted here.

In operation 530, the image preprocessor enhances the cropped image. For example, the image preprocessor may enhance the cropped image using a frequency transform method. The image preprocessor may perform a two-dimensional (2D) fast Fourier transform (FFT) on the cropped image to obtain frequency domain information of the cropped image.

To improve a performance of the FFT, the image preprocessor may crop the input image to have a length of a power of 2. The image preprocessor may set, to correspond to a twofold increase, at least one of a width length and a height length of a preset or, alternatively, desired size at which the input image is cropped. For example, the image preprocessor may set the size to be 56 pixels in height×128 pixels in width. In such an example, the image preprocessor may form a size of the cropped image to be a size of 128 pixels in height×128 pixels in width using a zero padding method, and then perform the FFT.

The image preprocessor may enhance the image by applying various filtering methods to the frequency domain information. For example, the image preprocessor may apply, to the frequency domain information, a low-pass filter or a band-pass filter. In operation 530, the image preprocessor may apply an image quality enhancement algorithm, other than an enhancement method based on the frequency transform method.

When the input image is an excessively high-resolution image, the image preprocessor performs image scaling in operation 510. The image scaling may include image decimation. For example, the image preprocessor may perform the image decimation by extracting a representative pixel value from pixel values of neighboring 2×2 pixels. When an image resolution is high, an operation quantity may also increase. Thus, the image preprocessor may appropriately reduce the resolution of the input image through the image decimation. The image preprocessor may perform the image decimation by reducing a data quantity of an image sample to maintain a quality greater than or equal to a preset or, alternatively, desired resolution.

The image decimation may not be limited to the method of extracting a representative pixel value, and various modifications may be made to the image decimation, for example, performing low-pass filtering on pixel values of neighboring pixels.

A result image obtained through the operations 510 through 530 may be transferred to a biological information verifying application. In operation 540, the biological information verifying application verifies biological information by comparing the result image to registered biological information 550. The biological information verifying application may use an image pattern matching-based fingerprint recognizer. The image pattern matching-based fingerprint recognizer may match two images, for example, a result image and a registered image, using a frequency-based matching method. Although, for ease of description, the image preprocessor and the biological information verifying application are described to be separate, the image preprocessor may be included as an input end of the biological information verifying application.

Figure 6:
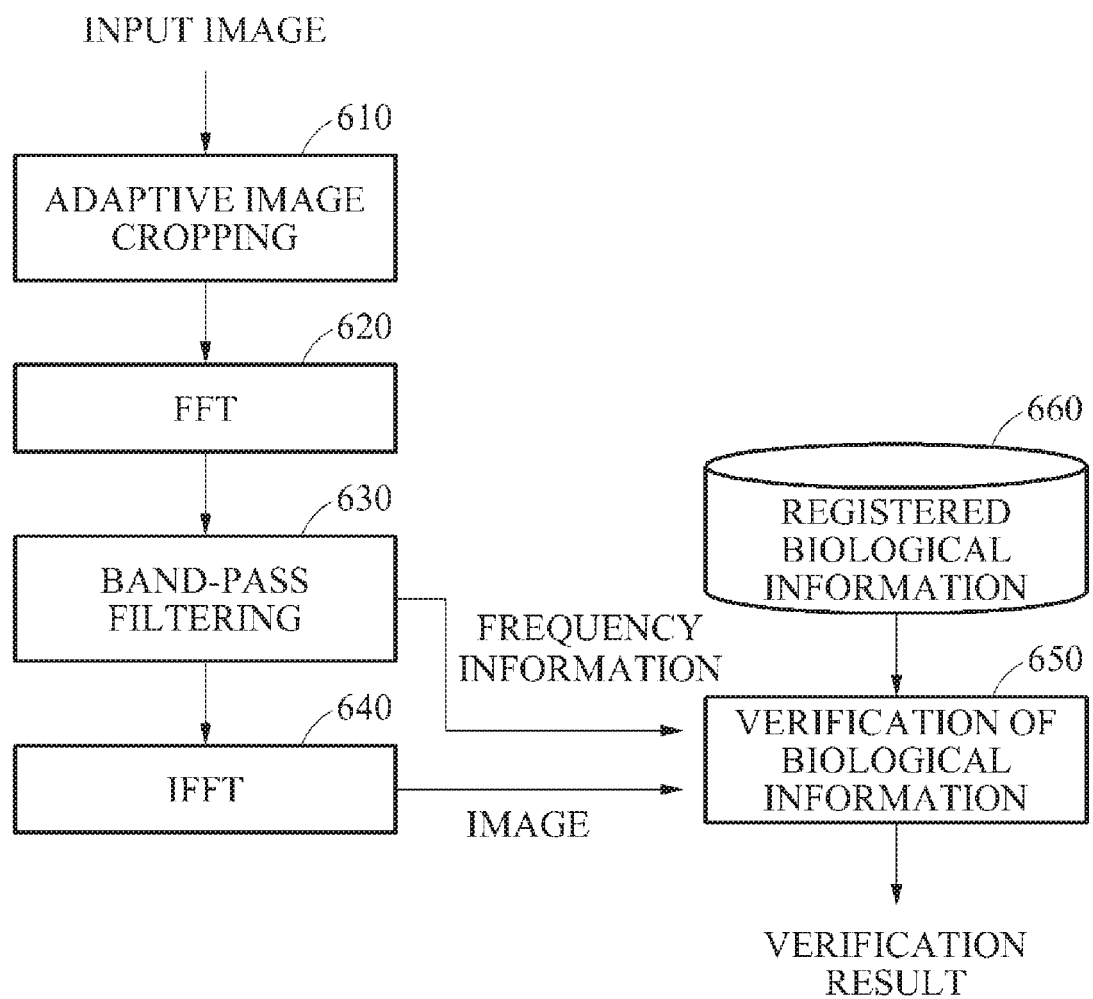
FIG. 6 illustrates an another example of a method of verifying biological information using an adaptive image cropping method according to at least one example embodiment.

FIG. 6 illustrates another example of a method of verifying biological information using an adaptive image cropping method according to at least one example embodiment. Referring to FIG. 6, in operation 610, an image preprocessor adaptively crops an input image. In operation 620, the image preprocessor performs an FFT. In operation 630, the image preprocessor applies band-pass filtering to frequency domain information. As a result of the operation 630, the frequency domain information may be output. In operation 640, the image preprocessor performs an inverse FFT (IFFT) to output image information.

In operation 650, a biological information verifying application verifies biological information based on the frequency domain information, the image information, or a combination thereof. For example, the biological information verifying application may verify the biological information by comparing the frequency domain information or the image information to registered biological information 660. The registered biological information 660 may correspond to the frequency domain information or the image information. The biological information verifying application may use an image pattern matching-based fingerprint recognizer.

Figure 7:
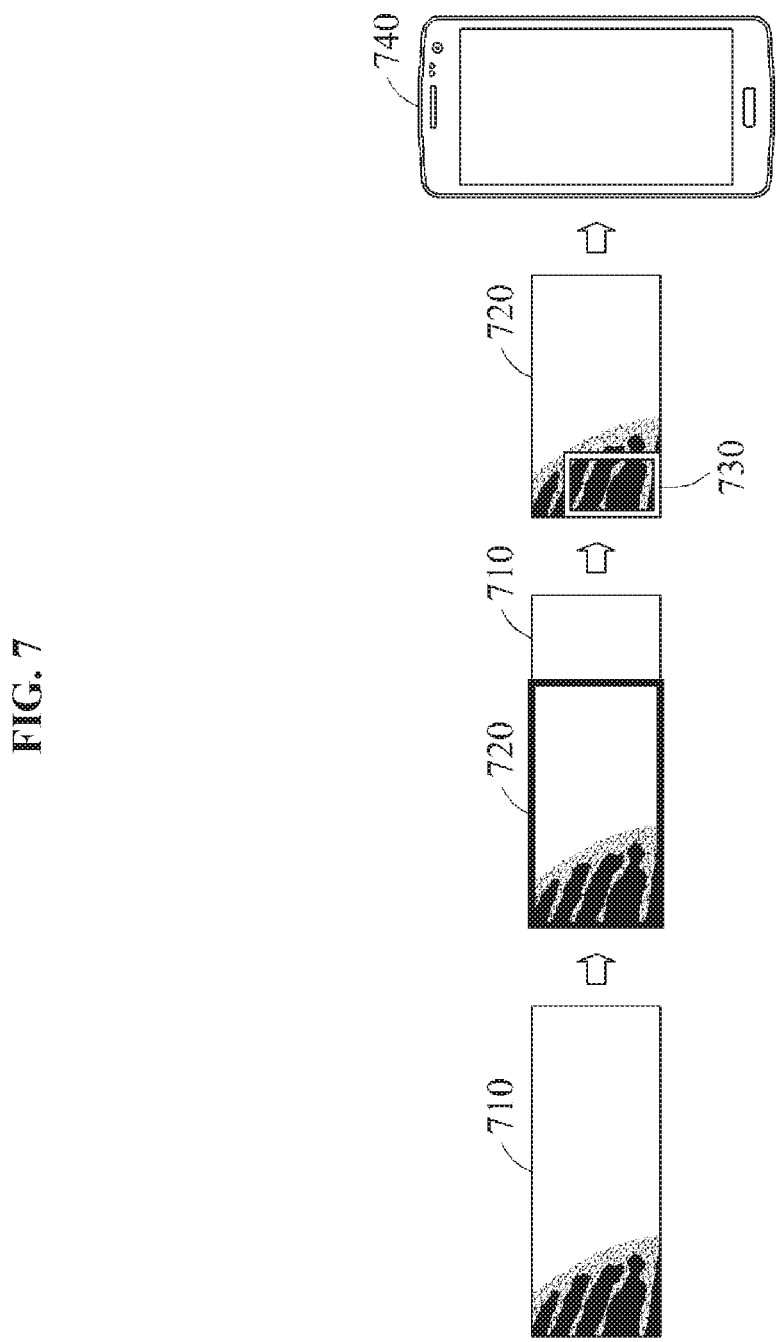
FIGS. 7 and 8 illustrate an operation of determining an effective area in an input image according to at least one example embodiment.
Figure 8:
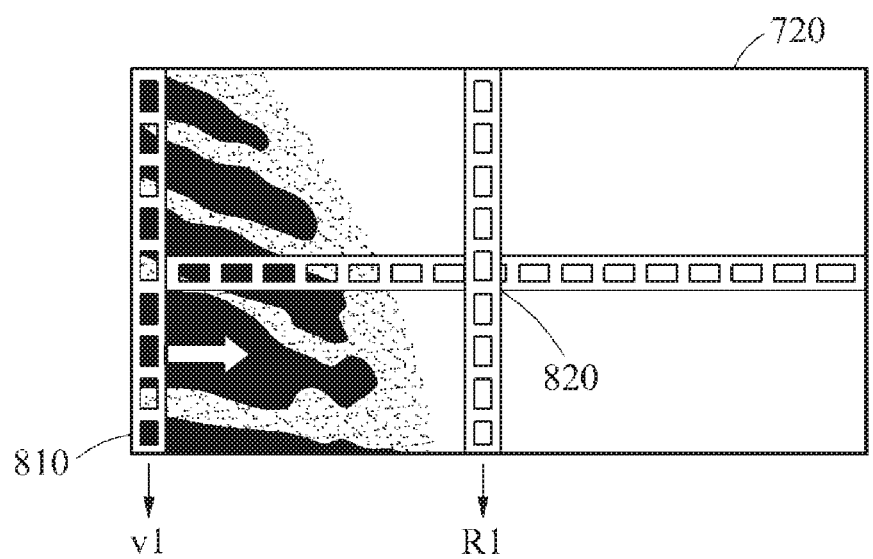

FIGS. 7 and 8 illustrate an example operation of determining an effective area in an input image according to at least one example embodiment. The operation of determining an effective area in an input image may be performed by an image preprocessor.

Referring to FIG. 7, an input image 710 includes fingerprint information. The input image 710 may be adaptively cropped through the methods described with reference to FIGS. 1 through 4B. The image preprocessor determines an effective area 730 in a cropped image 720. As necessary, the image preprocessor may directly determine the effective area 730 in the input image 710 before the cropping.

A device 740 using the image preprocessor may determine whether to request a new fingerprint input based on the determined effective area 730. For example, when the effective area 730 is smaller than a threshold area, the device 740 may determine that the input image 710 does not include sufficient fingerprint information. The device 740 may then provide feedback to a user, for example, "please check if your finger is right on the input area," which indicates the request for the new fingerprint input.

Hereinafter, the operation of determining an effective area in an input image will be described in detail with reference to FIG. 8. Referring to FIG. 8, the image preprocessor sets a reference line 820 in the input image 720. Here, the input image 720 may be the cropped input image. The reference line 820 may include at least one line crossing a center of the input image 720. For example, the reference line 820 may include two lines crisscrossing at the center of the input image 720. For ease of description, the reference line 820 is set to be the two lines as illustrated in FIG. 8. However, the reference line 820 may be a single line crossing the center of the input image 720, or at least three lines crossing the center of the input image 720.

The image preprocessor may calculate a reference energy value corresponding to the reference line 820. The image preprocessor may calculate the reference energy value corresponding to the reference line 820 based on pixel values of reference pixels included in the reference line 820. For example, the reference energy value may be a variance of the pixels values of the reference pixels.

The image preprocessor may set a line 810 in the input image 720. The image preprocessor may set the line 810 using a method similar to a method of setting an edge line. The image preprocessor may calculate an energy value of the line 810. The energy value of the line 810 may be a variance of pixel values of pixels included in the line 810.

The image preprocessor may determine an effective area in the input image 720 based on the reference energy value and the energy value of the line 810. For example, the image preprocessor may determine whether the line 810 is included in the effective area by comparing the energy value of the line 810 to the reference energy value. When the energy value of the line 810 is greater than the reference energy value, the image preprocessor may determine the line 810 to be a boundary of the effective area.

Conversely, when the energy value of the line 810 is less than the reference energy value, the image preprocessor may increase an index of the line 810. The line 810 may gradually move to an opposite edge direction, as iterations for determining the effective area in the input image 720 progress.

Here, in one example, when the energy value of the line 810 is equal to the reference energy value, the same process as when the energy value is less than the reference value may be performed.

In another example, when the energy value of the line 810 is equal to the reference energy value, the same process as when the energy value is greater than the reference energy value may be performed.

As illustrated in FIG. 8, all the pixels included in the line 810 include fingerprint information. Thus, the energy value of the line 810 may be calculated to be greater than the reference energy value. In such a case, the image preprocessor may determine the line 810 to be a left boundary of the effective area.

Although not illustrated in FIG. 8, the image preprocessor may perform the operation described in the foregoing on a line corresponding to a right edge, a line corresponding to an upper edge, and a line corresponding to a lower edge. Thus, the image preprocessor may determine a right boundary, an upper boundary, and a lower boundary of the effective area. The image preprocessor may determine whether a predetermined or, alternatively, desired number of boundaries, for example, four boundaries, are determined, and iterate the operation described in the foregoing until the predetermined or, alternatively, desired number of boundaries are set.

The image preprocessor may determine the effective area using the determined boundaries. For example, the image preprocessor may determine the effective area using the left boundary, the right boundary, the upper boundary, and the lower boundary. The image preprocessor may determine whether the input image 720 includes information sufficient for fingerprint authentication or fingerprint registration based on the effective area. For example, when the effective area is smaller than a threshold area, the image preprocessor may determine that the input image 720 does not include an amount of information sufficient for fingerprint authentication or fingerprint registration.

According to an embodiment, an operation of the image preprocessor may be implemented as an algorithm illustrated in Table 2.

TABLE 2

1. Calculate a reference variance (R1) at a center of an image, for example, a shape of +, or an entire image. Select one edge from four edges.
2. Calculate a variance (v1) of pixel values of pixels included in the selected edge, and compare v1 to R1.
3. When v1 is less than R1, remove an image on a line involved in the calculation of v1, and return to operation 2.
4. When v1 is greater than R1, select another remaining edge, and return to operation 2.
5. When processing is completed at all the edges, determine a remaining size (a width and a height) of the image to be an effective area.

Referring to Table 2, in operation 1, the R1 may be calculated as a variance of the entire image. When the size of the effective area is less than or equal to a threshold size after the operation 5, the input image may be determined to be an inadequate input. In such a case, the image preprocessor may request a user to re-input a fingerprint. At least some example embodiments described herein may be used as a method of adaptively registering biological information.

Figure 9:
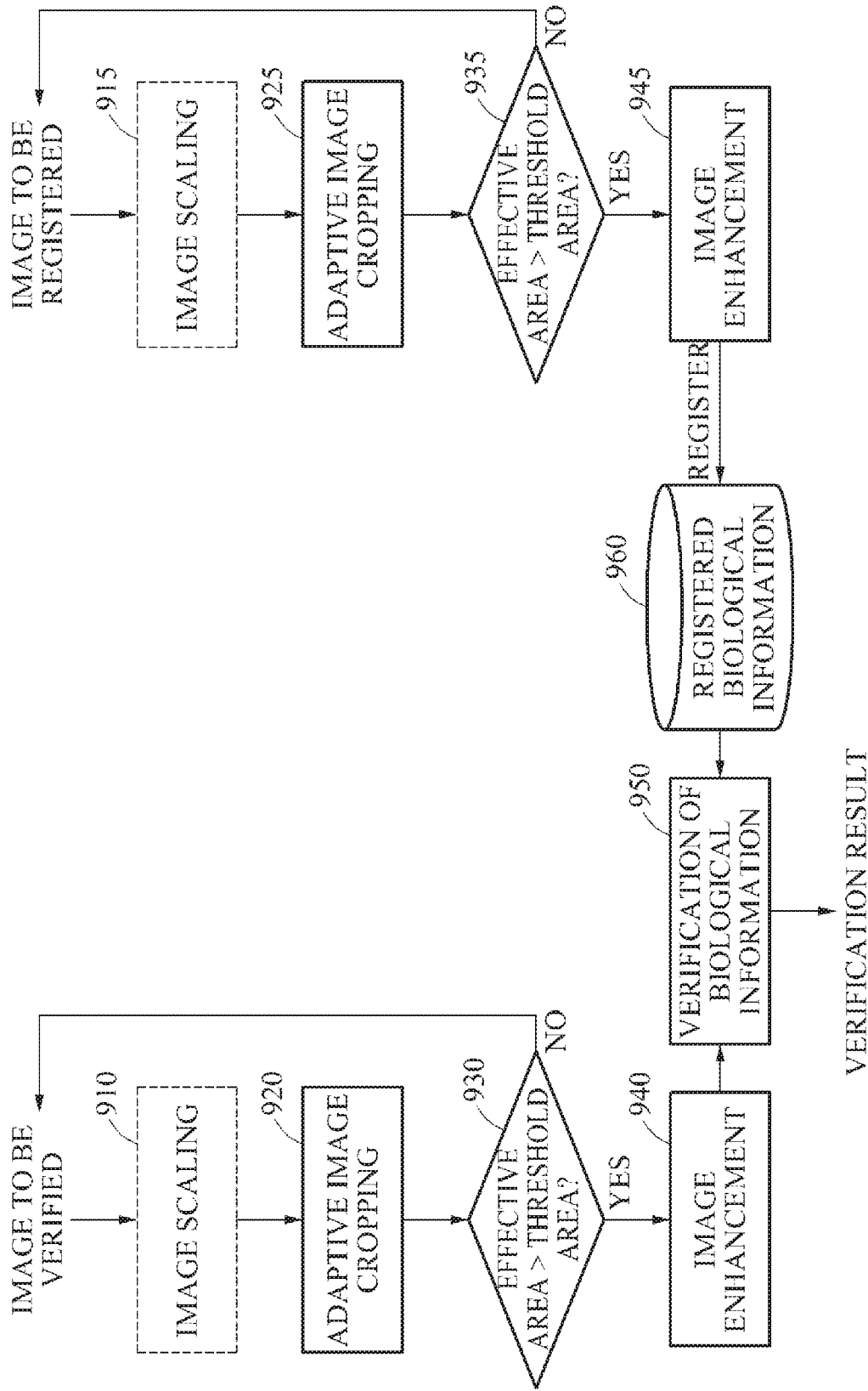
FIG. 9 illustrates a method of registering and verifying biological information using an adaptive image cropping method and an effective area determining method according to at least one example embodiment.

FIG. 9 illustrates an example of a method of registering and verifying biological information using an adaptive cropping method and an effective area determining method according to at least one example embodiment. Referring to FIG. 9, a biological information verifying device registers biological information through operations 925, 935, and 945. The biological information verifying device stores the registered biological information in a prearranged database 960.

In operation 925, the biological information verifying device adaptively crops an input image. The input image may correspond to an image to be registered. As necessary, in operation 915, the biological information verifying device performs image scaling on the image to be registered. For example, the biological information verifying device may enlarge or reduce a scale of the image to be registered before adaptively cropping the image to be registered.

In operation 935, the biological information verifying device calculates a size of an effective area, and determines whether the effective area is greater than a threshold area. In operation 945 through the operation 935, the biological information verifying device enhances the image. The biological information verifying device may store a result image in the database 960. The result image may be frequency domain information or image information.

The biological information verifying device verifies biological information through operations 920, 930, 940, and 950. The biological information verifying device verifies the biological information using the registered biological information stored in the database 960.

In operation 920, the biological information verifying device adaptively crops an input image. The input image may correspond to an image to be verified. As necessary, in operation 910, the biological information verifying device enlarges or reduces a scale of the input image before adaptively cropping the input image.

In operation 930, the biological information verifying device calculates a size of an effective area and determines whether the effective area is greater than a threshold area. In operation 940 through the operation 930, the biological information verifying device enhances the image. In operation 950, the biological information verifying device verifies the biological information by comparing a result image to the registered biological information stored in the database 960. The result image and the registered biological information may be frequency domain information or image information.

The descriptions provided with reference to FIGS. 1 through 8 may be applicable to the operations described with reference to FIG. 9 and thus, more detailed descriptions will be omitted here.

Figure 10:
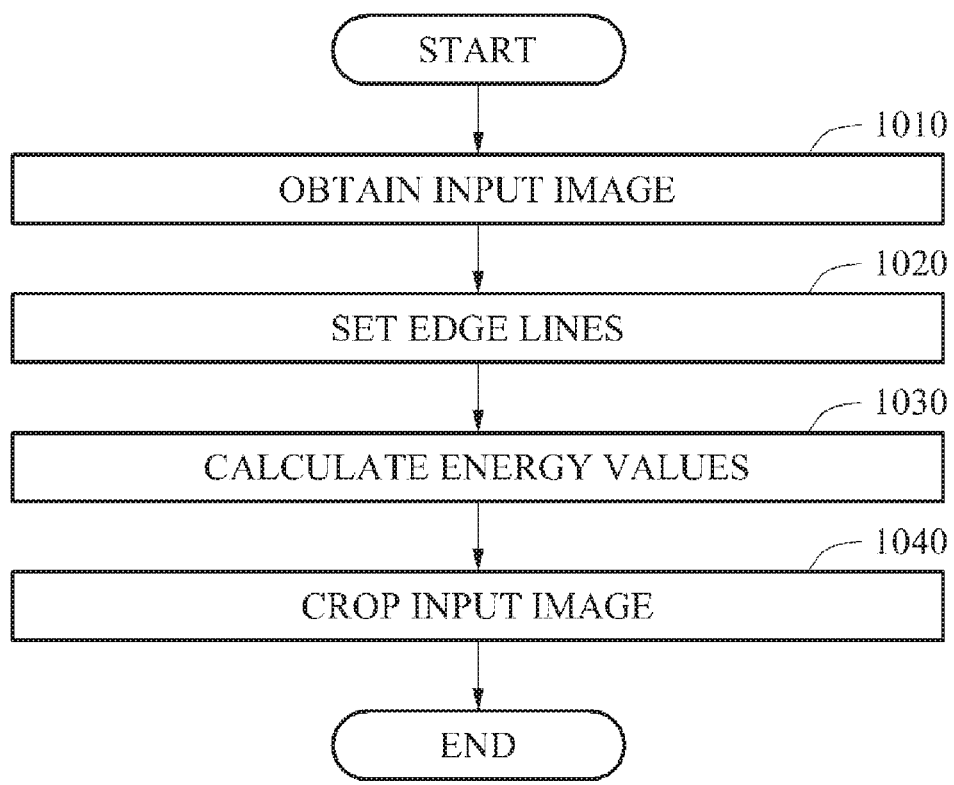
FIGS. 10 and 11 are flowcharts illustrating an image preprocessing method according to at least one example embodiments.
Figure 11:
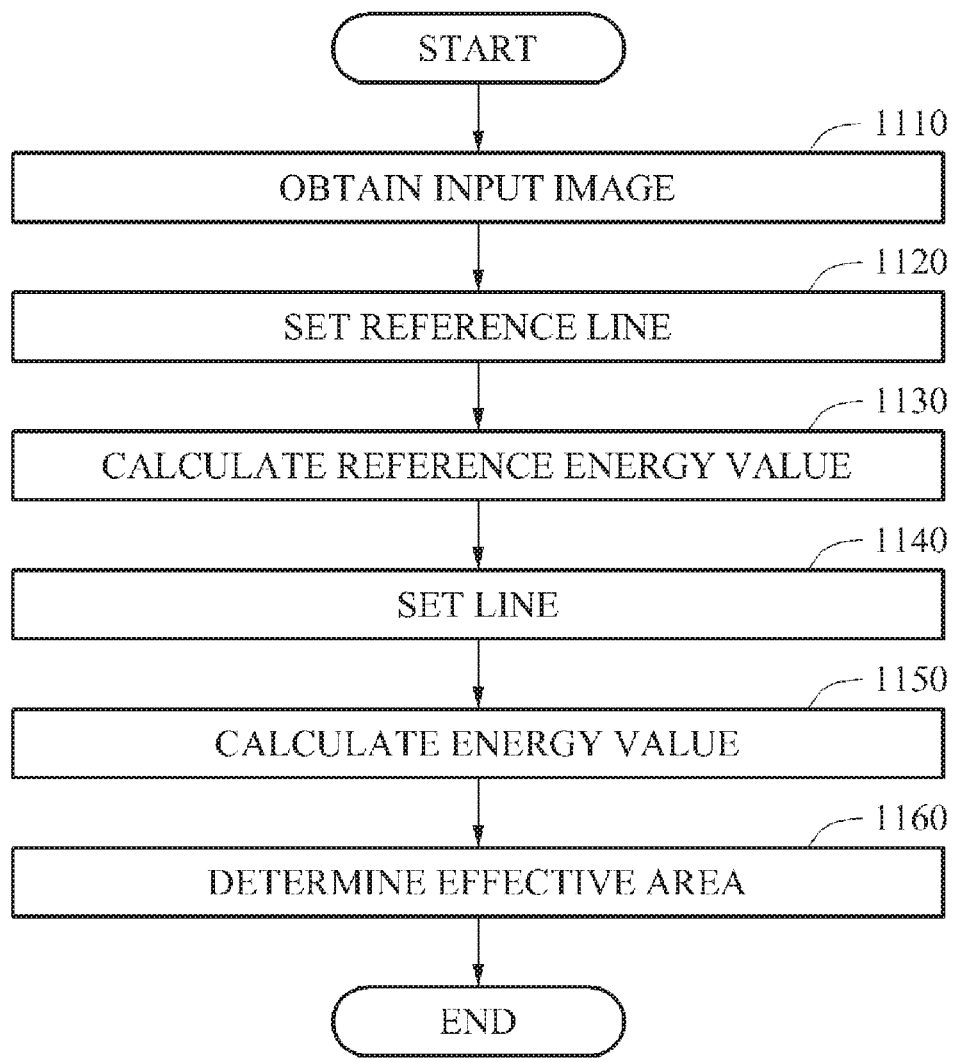

FIGS. 10 and 11 are flowcharts illustrating an image preprocessing method according to at least one example embodiment. Referring to FIG. 10, one example of the image preprocessing method includes operation 1010 of obtaining an input image including biological information, operation 1020 of setting edge lines in the input image, operation 1030 of calculating energy values corresponding to the edge lines, and operation 1040 of cropping the input image based on the energy values.

Referring to FIG. 11, another example of the image preprocessing method includes operation 1110 of obtaining an input image including biological information, operation 1120 of setting a reference line in the input image, operation 1130 of calculating a reference energy value corresponding to the reference line, operation 1140 of setting a line in the input image, operation 1150 of calculating an energy value corresponding to the line, and operation 1160 of determining an effective area in the input image based on the reference energy value and the energy value.

The descriptions provided with reference to FIGS. 1 through 8 may be applicable to the operations described with reference to FIGS. 10 and 11 and thus, more detailed descriptions will be omitted here.

Figure 12:
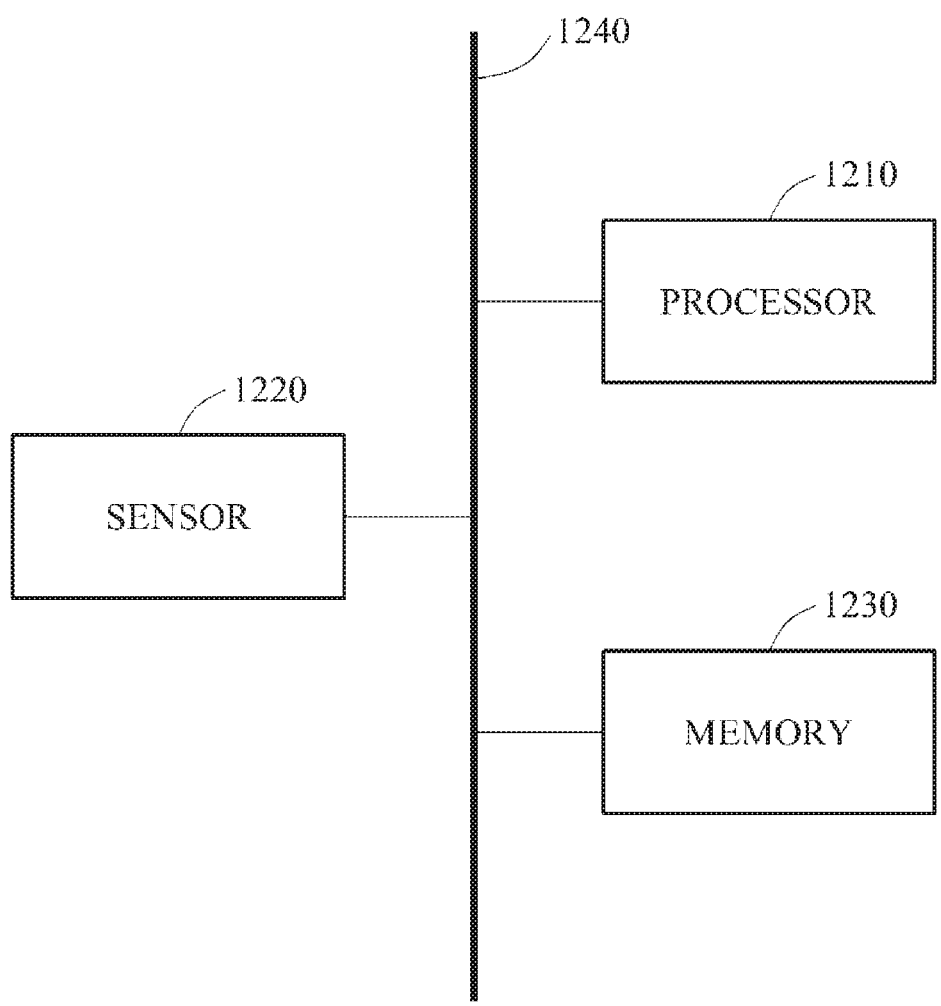
FIG. 12 illustrates an electronic system according to at least one example embodiment.

FIG. 12 illustrates an example of an electronic system according to at least one example embodiment. Referring to FIG. 12, the electronic system includes a sensor 1220, a processor 1210, and a memory 1230. The sensor 1220, the processor 1210, and the memory 1230 may communicate with one another through a bus 1240.

The sensor 1220 may be the sensor 110 illustrated in FIG. 1. The sensor 1220 may capture a fingerprint image using a well-known method, for example, a method of converting an optical image to an electrical signal. The captured image may be output to the processor 1210.

The processor 1210 may include or embody any or all modules described with reference to FIGS. 1 through 8 (e.g., the preprocessor), or perform any or all operations of any or all methods described above with reference to FIGS. 1 through 8. The memory 1230 may store registered biological information, the input image captured by the sensor 1220, a result image obtained by cropping the input image by the processor 1210, an effective area calculated by the processor 1210, and the like. The memory 1230 may be a volatile memory or a nonvolatile memory.

The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers.

The processor 1210 may execute a program, and control the electronic system. A program code to be executed by the processor 1210 may be stored in the memory 1230. The electronic system may be connected to an external device, for example, a PC and a network, through an input and output device (not shown), and exchange data with the external device.

The electronic system may include various forms, for example, a mobile device such as a mobile phone, a smartphone, a personal digital assistant (PDA), a tablet PC, and a laptop computer, a computing device such as a PC, a tablet PC, and a netbook, and a TV, a smart TV, and a security device for gate control.

Although at least some example embodiments herein relate mainly to a case of recognizing a user using a fingerprint of the user, at least some example embodiments may be expanded to a case of recognizing the user using biological information of the user. Here, the biological information may include information about the fingerprint, information about blood vessels, and information about an iris of the user. In such a case, the processor 1210 may receive, from the sensor 1220, an input image corresponding to the biological information of the user, adaptively crop the input image, and calculate an effective area in the cropped image.

In one example, the sensor 1220 may include a sensor configured to recognize a blood vessel pattern of the user. The sensor 1220 may extract the blood vessel pattern from skin on a back of a hand of the user. The sensor 1220 may maximize or, alternatively, increase a brightness of blood vessels compared to the skin using an infrared lighting and a filter, and obtain an image including the blood vessel pattern. The processor 1210 may recognize the user by comparing the input image corresponding to the blood vessel pattern to pre-registered blood pattern images.

In another example, the sensor 1220 may include a sensor configured to recognize an iris pattern of the user. The sensor 1220 may scan or capture the iris pattern between a pupil and a sclera, which is white area of an eye, of the user. The processor 1210 may recognize the user by comparing an input image corresponding to the iris pattern to pre-registered iris pattern images.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. An image preprocessing method, comprising:
    obtaining an input image including biological information;
    setting a reference line in the input image;
    calculating a reference energy value corresponding to the set reference line;
    setting a first line in the input image;
    calculating a first energy value corresponding to the set first line;
    determining an effective area in the input image based on the reference energy value and the first energy value;
    determining whether a first number of boundaries is determined for the effective area; and
    setting a second line for a boundary yet to be determined in the input image, calculating a second energy value corresponding to the second line, and determining the effective area in the input image based on the reference energy value and the second energy value, in response to a determination that the number of boundaries is not determined for the effective area.

2. The method of claim 1, wherein the reference line comprises:
    at least one line passing through a center of the input image.

3. The method of claim 1, wherein the setting of the first line comprises:
    setting the first line in an order starting from any one edge of the input image to an opposite edge direction, progressing iteratively to determine the effective area.

4. The method of claim 1, wherein the reference energy value includes a variance of pixel values includes in the reference line, and the first energy value includes a variance of pixel values includes in the first line.

5. The method of claim 1, wherein the determining comprises:
    determining whether the first line is included in the effective area by performing a comparison operation based on the first energy value and the reference energy value.

6. The method of claim 1, wherein the determining comprises at least one of:
    determining the first line to be a boundary of the effective area in response to the first energy value being greater than the reference energy value; or
    setting a subsequent line in the input image, calculating a subsequent energy value corresponding to the subsequent line, and determining the effective area in the input image based on the reference energy value and the subsequent energy value, in response to the first energy value being less than the reference energy value.

7. The method of claim 1, further comprising:
    determining whether to receive a re-input image based on the effective area.

8. The method of claim 1, wherein the biological information includes at least one of fingerprint information, blood vessel information, and iris information.

9. The method of claim 1, wherein the determining comprises:
    setting a subsequent line in the input image, calculating a subsequent energy value corresponding to the subsequent line, and determining the effective area in the input image based on the reference energy value and the subsequent energy value, in response to the first energy value being less than the reference energy value.

* * * * *